United States Patent

[11] 3,553,433

| [72] | Inventor | Gordon B. Sorli |
| | | Burlington, Mass. |
| [21] | Appl. No. | 635,421 |
| [22] | Filed | May 2, 1967 |
| [45] | Patented | Jan. 5, 1971 |
| [73] | Assignee | Sylvania Electric Products Inc., |
| | | a corporation of Delaware |

[54] DATA STORAGE AND TRANSFER APPARATUS FOR PLURAL-VEHICLE IDENTIFICATION SYSTEMS
10 Claims, 4 Drawing Figs.

[52] U.S. Cl........................................................ 235/61.7,
235/61.11; 250/219
[51] Int. Cl......................................................... G01m 21/30;
G06k 7/00, G06k 7/10
[50] Field of Search............................................. 235/61.7,
61.115; 250/219ID; 340/146.3(RR), 347

[56] References Cited
UNITED STATES PATENTS
3,027,079  3/1962  Fletcher et al................  340/347X
3,417,231  12/1968  Stites et al....................  235/61.11(5)

*Primary Examiner*—Maynard R. Wilbur
*Assistant Examiner*—Thomas J. Sloyan
*Attorneys*—Norman J. O'Malley and Elmer J. Nealon

ABSTRACT: System for identifying a carrier vehicle and piggyback vehicles positioned thereon and for indicating the relationship of said piggyback vehicles to said carrier vehicle including apparatus for storing and transferring coded data sensed from a coded label affixed to the carrier vehicle and from coded labels affixed to the piggyback vehicles. The first coded digit of each piggyback vehicle label is made to differ from the first coded digit of the carrier vehicle label to distinguish between the two types of vehicles. As the carrier and piggyback vehicles pass a single label reading apparatus, the coded data is sensed from each of the labels, stored sequentially in a main register, monitored to determine the nature thereof, that is, whether carrier data or piggyback data, gated into serially coupled subsidiary registers corresponding to the various carrier and piggyback vehicles, and subsequently read out from the subsidiary registers in a predetermined association.

3,553,433

DATA STORAGE AND TRANSFER APPARATUS FOR PLURAL-VEHICLE IDENTIFICATION SYSTEMS

BACKGROUND OF THE INVENTION

The invention described in the instant application relates to data storage and transfer apparatus. More particularly, it is concerned with plural-vehicle identification systems embodying said data storage and transfer apparatus for identifying carrier vehicles and piggyback vehicles carried thereon, and for indicating the relationships of the piggyback vehicles to the carrier vehicle.

In recent years, various types of object identification systems and apparatus have appeared for sensing, decoding, and printing out coded information disposed on moving objects. Included among the different types of identification systems are those which rely for their operation on principles of optics, radioactivity, magnetics, ultrasonics, and radio frequency.

As applied to such objects as vehicles, and particularly railway vehicles, it has been recognized that many of the various prior art systems of the above mentioned types are theoretically capable of sensing single codes or coded labels disposed on vehicles presented in succession to code-reading equipment, and of providing individual printed readouts, arranged sequentially in a column format, identifying the vehicles. However, it has also been recognized that such systems are not suitable for identifying several physically related vehicles, for example, railway piggyback vehicles disposed on a railway carrier vehicle, while at the same time positively and unambiguously indicating the relationships in the printed readouts of the "carried" vehicles to the "carrying" vehicle.

The capability of a system of positively and unambiguously indicating the association between each carrier vehicle and the vehicles carried thereon becomes quite significant at certain times, for example, whenever it is necessary or desirable to reroute a particular vehicle from its present location on a carrier vehicle to another carrier vehicle or to some other destination. At such times, the present location of the vehicle must be readily ascertained.

One prior art system which is capable of identifying several interrelated vehicles and of indicating the relationships of the carried vehicles to the carrying vehicle requires the use of a plurality of separate scanners, one scanner at the level of the carrier vehicle and one scanner at each level at which a coded label on a carried vehicle is likely to appear. In operation, as the vehicles equipped with labels pass the scanners corresponding to the levels of the labels, information is sensed from each label and applied to a separate storage register corresponding to the particular label level. The information pertaining to the vehicles is then read out from the system in a predetermined association.

A primary disadvantage of this system is that in large scale transportation systems involving great numbers of vehicles, the multiplication of scanning equipment at each reading location can prove to be quite costly and impractical. An additional disadvantage of the above-described system is that no provision is made in such system for preventing superfluous data derived from a label, as might occur, for example, when the direction of travel of a carrier vehicle is improperly or accidentally reversed and the label is reread, from being improperly stored in a system storage register and printed out.

SUMMARY OF THE INVENTION

The present invention is adapted to identify and to indicate the relationships between several vehicles physically arranged in a group, for example, railway piggyback vehicles or cargo containers disposed on a flatbed carrier, while at the same time avoiding difficulties and disadvantages associated with the prior art systems and apparatus as described hereinabove. A principal advantage of the instant invention and identifying and relating each vehicle of a group of vehicles is a novel data storage and transfer apparatus which eliminates the need for several label scanners for deriving the required identification information from the various vehicle labels. An additional advantage of the instant invention is the provision of means in the data storage and transfer apparatus for preventing superfluous data derived from improper or erroneous multiple readings of a label from being stored in the system and subsequently printed out.

Briefly, the identification system of the invention includes a vehicle and at least one object associated therewith. Where one object is associated with the vehicle, both the vehicle and object are equipped with information-coded labels, the code information on the vehicle label and object label including features distinguishing the vehicle and object labels from each other. A label-reading means is located at a label-reading area for providing a pair of successive signals representative of the code information on the vehicle label and on the object label, including representations of the distinguishing features. The aforementioned signals are provided by the label-reading means during the presence of the vehicle in the label-reading area as indicated by a vehicle detection means. Means are also provided for determining whether each of the signals provided by the label-reading means is a representation of the code information on the vehicle label or the code information on the object label. In accordance with the determinations, the signals provided by the label-reading means are selectively transferred to a pair of storage means. The signals are read out of the pair of storage means in a predetermined association in response to the departure of the vehicle from the label-reading area.

In situations where more than one object is associated with a vehicle, each object is equipped with an information coded label. As before, the vehicle label and object labels are read in succession by the above-mentioned label-reading means and, upon a determination as to whether the signals provided by the label-reading means are representations of vehicle code information or object code information, the various signals are selectively transferred to a plurality of storage means. As will become apparent hereinafter from a detailed discussion of the invention, the signals representative of code information on the vehicle label and on the first object label to be read by the label-reading means are transferred, upon a recognition of the representations of the distinguishing features thereof, to first and second ones of the plurality of storage means, respectively. The signal representative of code information on the next object label to be read by the label-reading means is transferred to a third one of the plurality of storage means only after such signal has been compared with the immediately preceding object signal and a comparison therebetween found to be lacking. As in the previous example, the signals stored in the plurality of storage means are read out in a predetermined association in response to the departure of the vehicle from the label-reading area.

DESCRIPTION OF PREFERRED EMBODIMENT

Figure 1:
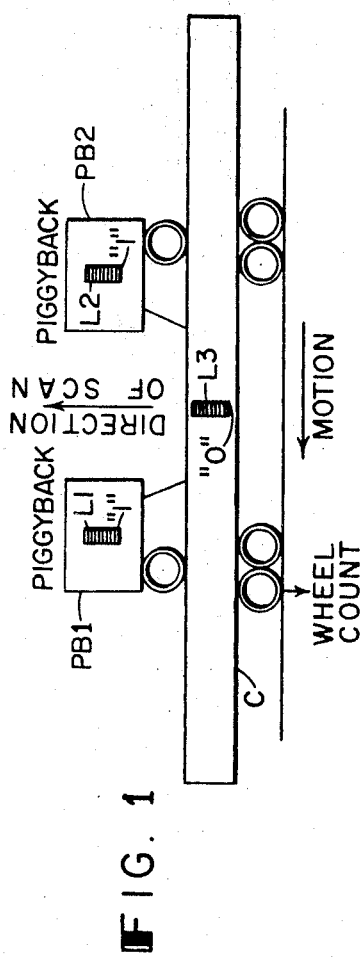
FIG. 1 is a pictorial representation of a typical multivehicle unit including a label-equipped railway flatbed carrier vehicle upon which a pair of label-equipped railway piggyback vehicles are positioned.

Referring to FIG. 1, there is shown a pictorial representation of a typical arrangement of railroad vehicles including a standard flatbed carrier vehicle C, and a pair of standard piggyback vehicles PB1 and PB2. Each vehicle is equipped with a rectangular coded identification label, designated as L1, L2, and L3 in FIG. 1, for example, of the type disclosed in U.S. Pat. No. 3,225,177 to Stites et al., to which reference may be had for specific details. The Stites et al. patent is assigned to the same assignee as the present application.

Figure 2:
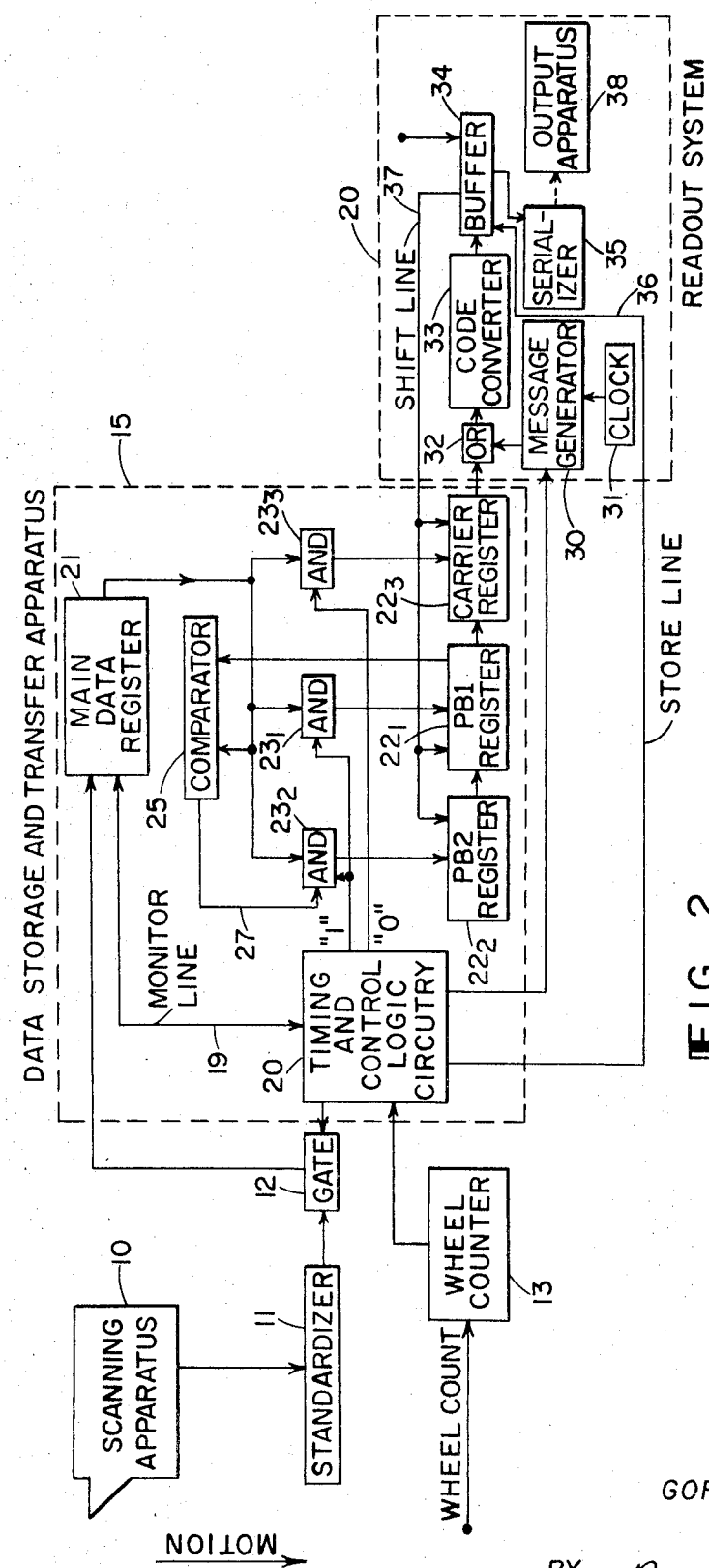
FIG. 2 is a block diagram of a vehicle identification system adapted to identify the carrier and piggyback vehicles illustrated in FIG. 1 and embodying the data storage and transfer apparatus of the invention.

In order for the apparatus of the vehicle identification system of FIG. 2 to be able to distinguish between a carrier vehicle and a piggyback vehicle, the first coded digit of the piggyback vehicle label L1 and the piggyback vehicle label L2 represents a decimal "1" as shown in FIG. 1; the first coded digit of the carrier vehicle label L3 represents a decimal "0". If desired a coded digit other than the first digit may be used as a feature to distinguish between the two types of vehicles. Moreover, other techniques for distinguishing between the two types of vehicles, for example, employing individual vehicle distinguishing codes or different distinguishing bit widths, may be employed. The carrier and piggyback vehicles shown in FIG. 1 are identified by the vehicle identification system shown in FIG. 2.

As shown in FIG. 2, the vehicle identification system comprises scanning apparatus 10, a standardizer 11 coupled to the scanning apparatus 10 and to a gate 12, a wheel counter 13, and a data storage and transfer apparatus 15 coupled to the gate 12, to the wheel counter 13, and to a readout system 20. The data storage and transfer apparatus 15 further comprises: timing and control logic circuitry 20; a main data register 21 coupled at the input end to the gate 12 and to the timing and control logic circuitry 20; a plurality of subsidiary registers 22; a plurality of AND gates 23 coupled to the subsidiary registers 22 and to the output end of the main data register 21; and a comparator 25 coupled to the main data register 21, to each of the AND gates 23, and to one of the subsidiary registers $22_1$.

Data readout system 20 further includes: a message generator 30; a real-time clock 31; an OR gate 32 coupled to one of the subsidiary registers $22_3$ and to the message generator 30; a code converter 33 coupled to the OR gate 32; a buffer 34 coupled to the timing and control logic circuitry 20, the registers 22, and to the code converter 33; a serializer 35 coupled to the buffer 34; and output equipment 38 coupled to the serializer 35. The operation of the vehicle identification system of FIG. 2 to read the coded labels on the vehicles shown in FIG. 1 and to identify said vehicles will now be described in detail.

As the carrier vehicle C carrying the two piggyback vehicles PB1 and PB2 moves within the reading range of the scanning apparatus 10 in the direction indicated in FIG. 2, a WHEEL COUNT signal from a suitable vehicle wheel detector is applied to the wheel counter 13 to indicate the presence of the carrier vehicle C in the reading area. A signal from the wheel counter 13 causes the timing and control logic circuitry 20 to enable the gate 12 to permit the coded information sensed from the first scanned vehicle label L1 to pass therethrough. The gate 12 is closed by the timing and control logic circuitry 20 after the label L1 has been read by the scanning apparatus 10 and reopened after the information sensed from the label L1 is processed by the data storage and transfer apparatus 15. The vehicle labels are read in the sequence in which the vehicles are presented to the scanning apparatus 10, with the gate 12 being opened prior to each reading and closed subsequent to the processing of the coded information sensed from each label. Thus, in the arrangement of FIG. 1, the label L1 of the piggyback vehicle PB1 is read first, and then the label L3 on the carrier vehicle C, and lastly, the label L2 on the piggyback vehicle PB2. The specific details of the manner in which the label-reading operations take place are described in the aforementioned Stites et al. patent. It is sufficient only to note that the labels L1, L2, and L3 are mounted on their corresponding vehicles so as to be encompassed within the scan of the scanning apparatus 10.

The coded data read from each vehicle label is applied by the scanner 10 in a pulse code form to the standardizer 11 which converts each code pulse to an amplitude and width suitable for further processing by the system. The coded data processed by the standardizer 11 is gated through the gate 12 to the main data register 21. The main data register 21 is adapted to store at a given instant only the coded data sensed from a single label.

With the above arrangement of vehicles, the coded data initially gated via the gate 12 into and stored by the main data register 21 is that sensed from the piggyback vehicle label L1. Once the data is stored, the first code bit thereof is monitored over a MONITOR line 19 by the timing and control logic circuitry 20 to determine its particular nature, that is, whether it represents a "0" or a "1" digit. In the case of the label L1, the first code bit represents a decimal "1" digit, as previously described. Once the nature of the distinguishing feature has been recognized to be a "1", an enabling control signal is applied by the timing and control logic circuitry 20 to first inputs of the AND gates $23_1$ and $23_2$ and also to the main data register 21 over the MONITOR line 19. The label L1 data is gated out of the main data register 21, through the AND gate $23_1$, and into the subsidiary register $22_1$ corresponding to the piggyback vehicle PB1. Once the register $22_1$ is loaded, no additional data will be stored thereby until cleared. It is to be noted that no data is gated into the subsidiary register $22_2$ via the AND gate $23_2$ inasmuch as no enabling signal is present at this time on a line 27 leading to the AND gate $23_2$.

In the same manner as described above, the distinguishing feature of the second label to be scanned by the scanner 10, i.e., the carrier label L3, is recognized to be a "0" and an enabling control signal is applied by the timing control logic circuitry 20 to a first input of the AND gate $23_3$ and, as before, to the main data register 21. The label L3 data stored in the main data register 21 is accordingly gated out therefrom, through the AND gate $23_3$, and into the subsidiary register $22_3$ corresponding to the carrier vehicle C.

The label L2 coded data is also stored in a corresponding subsidiary register 22 but in a somewhat different manner than just described for the carrier vehicle C and the piggyback vehicle PB1. As shown in FIG. 2, a comparator 25 is included in the data storage and transfer apparatus 15 for analyzing the coded data sensed from the piggyback vehicle label L2 and for initiating transfer of such data to the appropriate corresponding subsidiary register 22, in this case, the subsidiary register $22_2$.

The comparator 25 accomplishes the above mentioned transfer by comparing the piggyback vehicle data derived from the piggyback vehicle label L2 and applied to the main data register 21 with the immediately preceding piggyback vehicle data stored in the subsidiary register $22_1$. Since the coded data associated with the piggyback vehicle PB2 is made to differ from the coded data associated with the piggyback vehicle PB1, even though both coded labels L1 and L2 have the same "distinguishing" coded digit, that is, a coded digit representing a decimal "1", the comparator 25 serves to provide a signal indicating a lack of comparison therebetween on a line 27 to a first input of the AND gate $23_2$. Once the AND gate $23_2$ is enabled by the signal on the line 27, and an enabling signal is received from the timing and control logic circuitry 20 over the "1" line, the data from the data register 21 is gated through the AND gate $23_2$ into the subsidiary register $22_2$ corresponding to the piggyback vehicle PB2.

The comparator 25 also serves the function of preventing coded data sensed from a piggyback vehicle label from being applied to more than a single subsidiary register 22 and from being subsequently printed out. For example, assume that the piggyback vehicle label L1 has been read once as the carrier vehicle C is moved past the scanning apparatus 10. If the direction of travel of the carrier vehicle C is suddenly reversed, and the carrier vehicle C moves in the opposite direction a short distance, the piggyback vehicle label L1 again comes into view of the scanning apparatus 10 and is read for a second time. When this reversal of direction occurs, the comparator 25 prevents the storage of the superfluous data by determining that the data sensed from the reread label L1 is the same as that already stored in the subsidiary register $22_1$ pertaining to the piggyback vehicle PB1. Accordingly, no enabling control signal is applied to the AND gate $23_2$ by the comparator 25, and the label L1 data is not improperly and unnecessarily applied to a second subsidiary register 22. The comparator 25 also prevents superfluous data such as derived from multiple reading of a label on a piggyback vehicle when the carrier vehicle is not in motion, or moving very slowly, from being improperly applied to a subsidiary register. Thus, in FIG. 2, since the comparator 25 enables the gate $23_2$ only upon a noncomparison of signals, the data derived from a reread label cannot be applied to the subsidiary register $22_2$ in addition to the subsidiary register $22_1$.

After all the label information has been correctly and properly transferred from the main data register 21 to the appropriate subsidiary registers 22, readout of such information is effected as follows. Upon receipt of a timing signal from the wheel counter 13 conversion that the carrier vehicle C is leaving the reading zone of the scanning apparatus 10, a timing signal is applied by the timing and control logic circuitry 20 to a STORE line 36 coupled to the buffer 34. In response to the timing signal from the timing and control logic circuitry 20, shift pulses are applied by the buffer 34 to a SHIFT line 37 to cause the label data stored in the registers $22_1$, $22_2$, and $22_3$ to be gated out in a serial manner to the OR gate 32, code converter 33, and after conversion by the code converter 33, to the buffer 34. The code converter 33 converts the code type utilized on the carrier and piggyback labels, described fully in the aforementioned Stites et al. patent, into a standard five-level teletypewriter code, for example. If desired, additional data, for example, train direction, date, time of day, and scanner location may also be applied to the code converter 33 by the message generator 30 under control of the timing and control logic circuitry 20 and the real-time clock 31.

Upon external command or automatically, the data stored in the buffer 34 is read out into the serializer 35 and applied to suitable output equipment 38, for example, remote or local printout apparatus. With the arrangement of subsidiary registers 22 shown in FIG. 2, a typical printout of the individual carrier and associated piggyback vehicle data may take place in a single line or in some other identifiable grouping. For example, the carrier vehicle data may be printed out first and followed on the same line or on one or more indented lines thereunder by the piggyback vehicle PB1 data and the piggyback vehicle PB2 data. In the event a carrier vehicle label is missing or incapable of being read, the empty condition of the subsidiary register $22_3$ corresponding to the carrier vehicle C indicates this fact, and a series of decimal zeros may be read out of the register $22_3$ into the output equipment to distinguish between missing or unreadable label situations and other system failures.

In the above described manner, the association of each piggyback vehicle on a carrier vehicle with its carrier vehicle is clearly indicated and the location of a particular piggyback vehicle can be readily determined without confusion or ambiguity. Although not shown in the drawings, the sequence in which the data is printed out may easily be altered by simply rearranging the input connections of the AND gates 23 to accommodate the desired sequence.

In the above discussion, it has been assumed that both of the piggyback vehicles PB1 and PB2 are present on the carrier vehicle C. In the event that one piggyback vehicle is absent from its position on the carrier vehicle, or both piggyback vehicles are absent, whichever label or labels remain to be read will be read by apparatus shown in FIG. 2. For example, if the piggyback vehicle PB1 is absent, the carrier vehicle C label information will be monitored and stored in the register $22_3$ and the piggyback vehicle PB2 information will be monitored and stored in the subsidiary register $22_1$. If, instead, the other piggyback vehicle PB2 is absent, the carrier vehicle C label information will be monitored and stored in the register $22_3$, and the piggyback vehicle PB2 label information will be monitored and stored in the register $22_1$, as in the previous example. In the event that both piggyback vehicles are absent, only the carrier label information will be monitored and stored in a subsidiary register, that is, the subsidiary register $22_3$. It may be noted that in each of the three situations just described, no code comparisons are performed.

Figure 3:
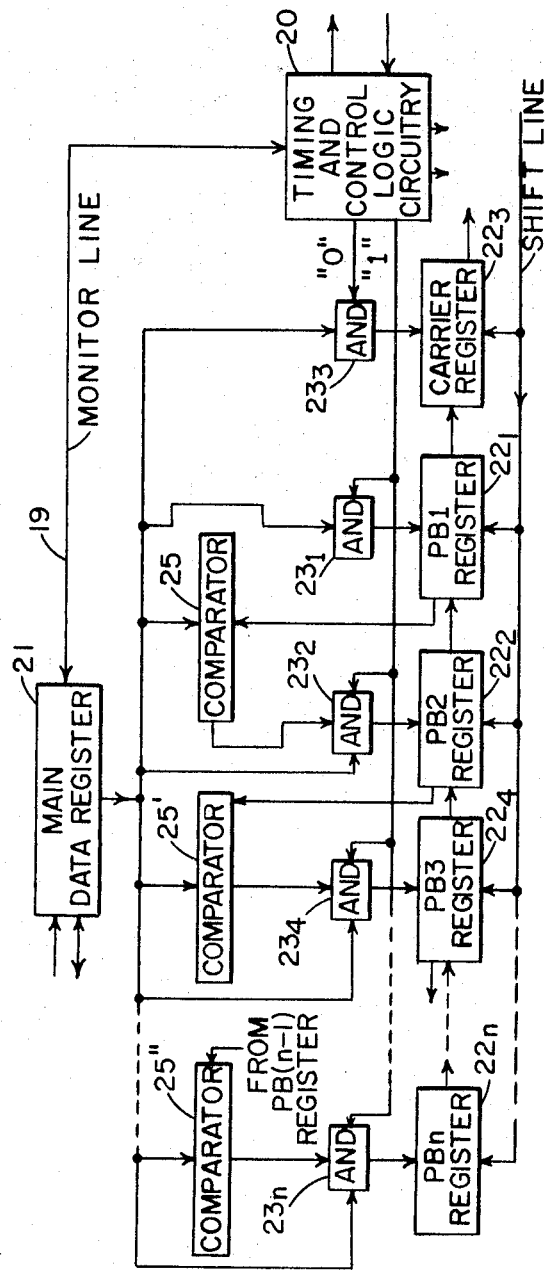
FIG. 3 shows in block diagram form an alternative arrangement to the data storage and transfer apparatus shown in FIG. 2 for accommodating the storage and transfer of coded data sensed from coded labels on more than two piggyback vehicles.

In the above discussion it has also been assumed that only two piggyback vehicles are carried by the carrier vehicle C. An arrangement for permitting an expansion of the data storage capacity of the data storage and transfer apparatus 15 of FIG. 2 to accommodate a greater number of piggyback vehicles is shown in FIG. 3. As shown therein, additional subsidiary registers $22_4$....$22_n$, AND gates $23_4$....$23_n$, and comparators 25'....25'' are provided.

The operation of the apparatus of FIG. 3 is such that each new coded signal derived from a piggyback vehicle label and stored in the main data register 21 is compared with the piggyback vehicle data most recently stored in a subsidiary register 22. Thus, in FIG. 3, the comparator 25 compares new data from the main data register 21 with the data previously stored in the register $22_1$, and gates such new data into the subsidiary register $22_2$, provided that the subsidiary register $22_1$ data and the new data are nonidentical. Similarly, the comparator 25' compares data from the main data register 21 with the data stored in the subsidiary register $22_2$, and gates the data from the main data register 21, upon a determination of noncomparison, into the subsidiary register $22_4$. The comparator 25'' compares data from the main data register 21 with the data stored in the subsidiary register $22_{(n-1)}'$ and gates the data from the main data register 21, upon a determination of noncomparison, into the subsidiary register $22_n$. As in FIG. 2, the comparators 25....25'' prevent identical label data from being stored in more than one subsidiary register.

Figure 4:
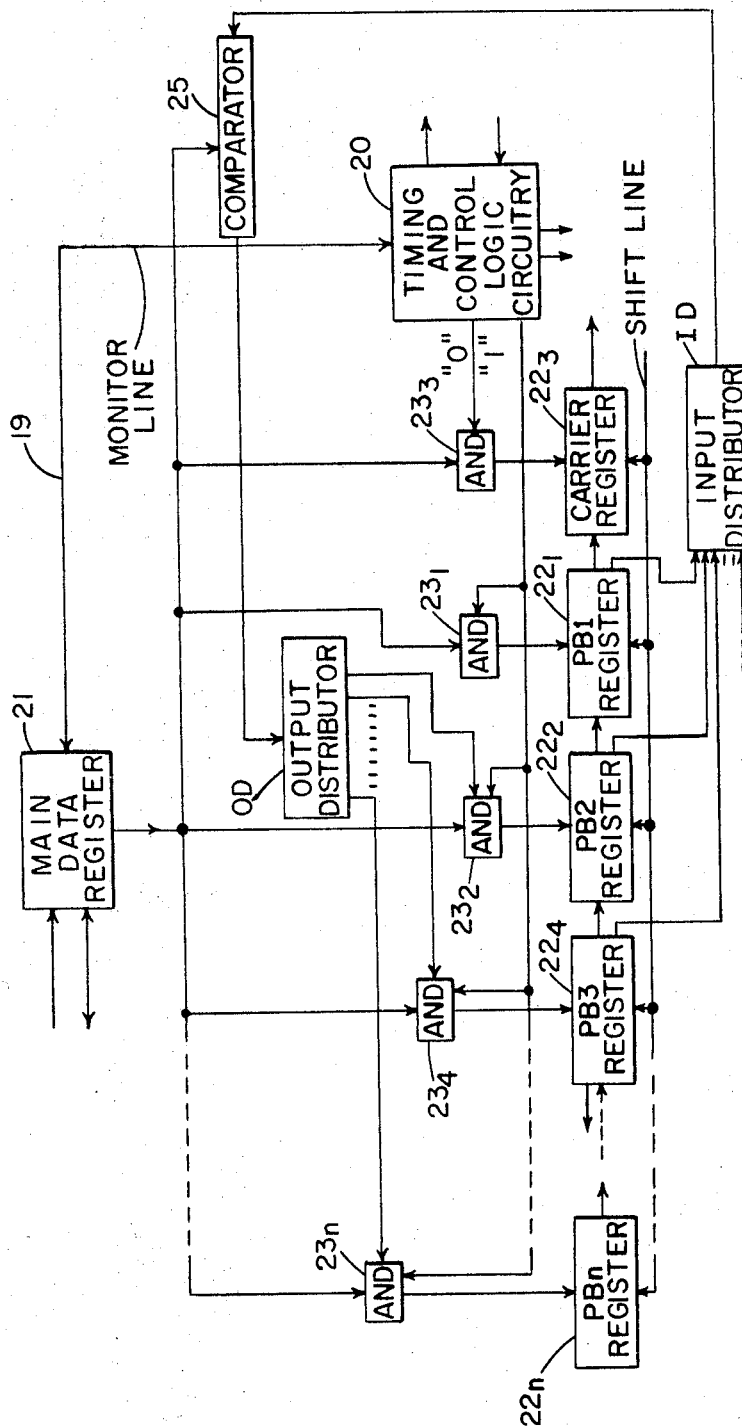
FIG. 4 shown in block diagram form yet another arrangement of the data storage and transfer apparatus.

The arrangement shown in FIG. 3 may be simplified in one aspect by using a single comparator 25. The simplified arrangement is shown in FIG. 4. As shown therein, the data stored in each of the subsidiary registers 22, with the exception of the last subsidiary register $22_n$, is gated individually and in a sequential manner to the comparator 25 by an input distributor ID and compared in the comparator 25 with new data that is continuously applied to and stored by the main data register 21 as vehicle labels are read.

For each comparison by the comparator 25, the data from the main data register 21 is gated through an appropriate one of the AND gates 23 by an output distributor OD to a subsidiary register next succeeding the subsidiary register from which data was derived for comparison in the comparator 25. For example, the data stored in the subsidiary register $22_2$ is gated into the comparator 25 by the input distributor ID and compared with data from the main data register 21. If there is a noncomparison of data, the output distributor OD enables and AND gate $23_4$ to permit data from the main data register 21 to pass therethrough into the subsidiary register $22_4$.

CONCLUSION

A vehicle identification system has been described for identifying a labeled carrier vehicle and labeled piggyback vehicles while at the same time indicating the relationships of the piggyback vehicles to the carrier vehicle. It is to be understood, however, that the system described is not limited to objects such as piggyback vehicles only. Thus, it is contemplated that one or more containers be disposed on a carrier and equipped with coded labels distinguishable in any suitable manner from the coded label affixed to the carrier. Furthermore, the containers need not be positioned adjacent to each other in the manner shown in FIG. 1 in connection with piggyback vehicles. Provided the container labels appear within the scan of the scanning apparatus, the containers may be placed one on top of the other in a stacked relationship. In such event, it is necessary only to provide sufficient storage capacity in the data storage transfer apparatus as described hereinabove.

Modifications of the data storage and transfer apparatus of the above described system of FIG. 2 are also possible. For example, the connection to the AND gate $23_2$ from the timing and control logic circuitry 20 may be omitted and the comparator 25 accordingly modified to accept only piggyback vehicle data, that is, data whose first coded digit represents a decimal "1". Alternatively, the AND gate $23_3$ could be modified to permit transfer of carrier vehicle data only to its associated subsidiary register $22_3$; the AND gates $23_1$ and $23_2$ would therefore be modified to permit transfer therethrough to the registers $22_1$ and $22_2$ of data pertaining to piggyback vehicles only.

It will now be apparent that a novel data storage and transfer apparatus for use in a multivehicle identification system has been disclosed in such full, clear, concise, and exact terms as to enable any person skilled in the art to which such apparatus pertains to construct and use the same. It will also be apparent that various changes and modifications may be made in form and detail by those skilled in the art without departing from the spirit and scope of the invention. Therefore, it is intended that the invention shall not be limited except by the appended claims.

I claim:

1. In an identification system including a vehicle and an object associated therewith, said vehicle and object each being equipped with an information coded label, the code information on the vehicle label and object label including features distinguishing said vehicle and object labels from each other, apparatus comprising:

vehicle detection means adapted to indicate the presence of said vehicle in a label-reading area and the subsequent departure therefrom;

Label-reading means at said label-reading area operative during the presence of said vehicle in said label-reading area to provide a pair of successive signals representative of the code information on the vehicle label and on the object label, said signals including representations of said distinguishing features;

a pair of storage means;

determining means coupled to said label-reading means and to the pair of storage means and adapted to determine whether each of the signals provided by said label-reading means is a representation of code information on the vehicle label or on the object label and to selectively transfer said signals to said pair of storage means in accordance with the determinations; and means coupled to the vehicle detection means and to the pair of storage means and responsive to the departure of said vehicle from said label-reading area to read out in a predetermined association the signals stored in said pair of storage means.

2. In an identification system in accordance with claim 1 wherein said determining means includes:

first storage means coupled to the label-reading means and adapted to store said signals provided by said label-reading means; and means coupled to the first storage means and to said pair of storage means and adapted to recognize the representations of said distinguishing features and to transfer the signal representative of the code information on the vehicle label and the signal representative of the code information on the object label from said first storage means to different ones of said pair of storage means.

3. In an identification system including a vehicle and a plurality of objects associated therewith, said vehicle and objects each being equipped with an information coded label, the code information on the vehicle label and on each of the object labels including features distinguishing said vehicle label from said object labels, apparatus comprising:

vehicle detection means adapted to indicate the presence of said vehicle in a label-reading area and the subsequent departure therefrom;

label-reading means at said label-reading area operative during the presence of said vehicle in said label-reading area to provide in succession a plurality of signals representative of the code information on the vehicle label and on each of the object labels, said signals including representations of said distinguishing features;

a plurality of storage means;

determining means coupled to said label-reading means and to the plurality of storage means and adapted to determine whether the signals provided by said label-reading means are representations of code information on the vehicle label or on the object labels and to selectively transfer said signals to said plurality of storage means in accordance with the determinations; and means coupled to the vehicle detection means and to the plurality of storage means and responsive to the departure of said vehicle from said label-reading area to read out in a predetermined association the signals stored in said plurality of storage means.

4. In an identification system in accordance with claim 3 wherein said determining means comprises:

first storage means coupled to the label-reading means and adapted to store said signals provided by said label-reading means;

means coupled to the first storage means and to said plurality of storage means and adapted to recognize the representation of the feature distinguishing the vehicle signal from the object signals and the representation of the distinguishing feature of the first-appearing signal provided by said label-reading means representative of code information on a first object label to transfer the signal representative of the code information on the vehicle label from said first storage means to a first one of said plurality of storage means and said first-appearing signal representative of the code information on said first object label from said first storage means to a second one of said plurality of storage means; and analyzing means coupled to the first storage means and to said plurality of storage means and adapted to compare the next succeeding signal provided by said label-reading means representative of code information on a second object label with said first signal representative of code information on said first object label, and in response to a lack of comparison therebetween, to transfer said next succeeding signal to a third one of said plurality of storage means.

5. In a system in accordance with claim 4 wherein:

said first storage means is adapted to store only one signal at a time and each signal is transferred therefrom in sequence.

6. In a system in accordance with claim 4 wherein said apparatus further includes: a plurality of additional analyzing means coupled to the first storage means and to said plurality of storage means, each additional analyzing means being adapted to compare a subsequent signal provided by said label-reading means representative of code information on an object label with the immediately preceding signal representative of code information on an object label, and in response to a lack of comparison therebetween, to transfer said subsequent signal to a subsequent one of said plurality of storage means.

7. In a system for processing a plurality of successively appearing signals, one of said signals being distinguishable from the remaining signals by the inclusion of a feature not present in any of the remaining signals, data storage and transfer apparatus comprising:

first storage means adapted to store said signals;

a plurality of at least three second storage means;

means coupled to the first storage means and to said plurality of second storage means and adapted to recognize said distinguishable one of said plurality of signals and the first-appearing one of said remaining signals and to transfer said distinguishable one of said plurality of signals from said first storage means to a first one of said plurality of second storage means and the first-appearing one of said remaining signals to a second one of said plurality of second storage means; and analyzing means coupled to the first storage means and to said plurality of second storage means and adapted to compare the next-appearing one of said remaining signals with the first-appearing one of said remaining signals and, in response to a lack of comparison therebetween, to transfer said next-appearing one of said remaining signals from said first storage means to a third one of said plurality of second storage means.

8. In a system in accordance with claim 7 wherein said data storage and transfer apparatus further includes: a plurality of additional analyzing means coupled to the first storage means and to said plurality of second storage means, each additional analyzing means being adapted to compare a subsequently appearing one of said remaining signals with the preceding one of said remaining signals, and in response to a noncomparison of the signals, to transfer said subsequently appearing signal from said first storage means to a subsequent one of said plurality of second storage means.

9. In a system in accordance with claim 7 wherein the analyzing means of said data storage and transfer apparatus includes:

comparison means for comparing signals, said comparison means being coupled to the first storage means;

first distributor means coupled to said comparison means and to all but the first and last ones of said plurality of second storage means, said first distributor means being operative to sequentially transfer signals stored in those of the plurality of second storage means coupled thereto to said comparison means; and second distributor means coupled to said comparison means and to all but the first and second ones of said plurality of second storage means, said second distributor means being operative to sequentially transfer signals appearing subsequent to the first-appearing one of said remaining signals from said first storage means to one of said second storage means coupled thereto in response to each lack of comparison in said comparison means between each one of said subsequently appearing signals and the immediately preceding signal.

10. In a system in accordance with claim 7 wherein: said first storage means is adapted to store only one signal at a time and each signal is transferred therefrom in sequence.